US009529852B1

(12) United States Patent
Tsun et al.

(10) Patent No.: US 9,529,852 B1
(45) Date of Patent: *Dec. 27, 2016

(54) SELECTING A TEMPLATE FOR A CONTENT ITEM

(71) Applicant: Google Inc., Mountain View, CA (US)

(72) Inventors: Stephen Tsun, Cupertino, CA (US); Jayavel Shanmugasundaram, Santa Clara, CA (US); Tao Xin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,148

(22) Filed: Aug. 11, 2015

Related U.S. Application Data

(63) Continuation of application No. 13/858,325, filed on Apr. 8, 2013, now Pat. No. 9,135,292.

(51) Int. Cl.
G06F 17/30 (2006.01)

(52) U.S. Cl.
CPC ... *G06F 17/30483* (2013.01); *G06F 17/30442* (2013.01)

(58) Field of Classification Search
None
See application file for complete search history.

(56) References Cited

U.S. PATENT DOCUMENTS

| 8,650,265 | B2 * | 2/2014 | Broder | G06Q 30/02 |
| | | | | 705/14.42 |
| 8,965,751 | B2 * | 2/2015 | Gopal | G06F 17/3089 |
| | | | | 704/2 |
| 2006/0253567 | A1 * | 11/2006 | Selin | H04L 65/1006 |
| | | | | 709/224 |
| 2008/0140476 | A1 | 6/2008 | Anand | |
| 2008/0201220 | A1 * | 8/2008 | Broder | G06Q 30/02 |
| | | | | 705/14.56 |
| 2009/0055725 | A1 | 2/2009 | Portnov | |
| 2009/0164312 | A1 | 6/2009 | Nadig | |
| 2009/0234815 | A1 * | 9/2009 | Boerries | G06F 17/30867 |
| 2009/0259631 | A1 * | 10/2009 | Farrell | G06F 17/30525 |
| 2010/0082411 | A1 | 4/2010 | Goyal | |
| 2010/0153400 | A1 | 6/2010 | Namir | |
| 2012/0102402 | A1 * | 4/2012 | Kwong | G06F 3/038 |
| | | | | 715/705 |
| 2012/0239498 | A1 | 9/2012 | Ramer | |

(Continued)

*Primary Examiner* — Hung Le
(74) *Attorney, Agent, or Firm* — Fish & Richardson P.C.

(57) ABSTRACT

Methods, systems, and apparatus, including computer programs encoded on a computer storage medium, for selecting a template for a content item. In one aspect, a method includes receiving a content item request that includes context data. A content item that is eligible to be presented in response to the content item request is identified. A determination is made that the content item includes a template variable that is resolved based on the context data. A template feed including a set of templates is identified based on the template variable. A template is selected from the template feed for the content item. The template can be selected based on the context data. The selected template is populated with content for the content item to create a formatted content item. The formatted content item is provided in response to the content item request.

20 Claims, 5 Drawing Sheets

(56) References Cited

U.S. PATENT DOCUMENTS

| | | | |
|---|---|---|---|
| 2013/0007586 A1* | 1/2013 | Thomas | G06F 17/30905 715/234 |
| 2013/0024757 A1* | 1/2013 | Doll | G06Q 50/01 715/204 |
| 2013/0044761 A1* | 2/2013 | Koponen | H04L 12/66 370/401 |

* cited by examiner

SELECTING A TEMPLATE FOR A CONTENT ITEM

CROSS-REFERENCE TO RELATED APPLICATIONS

This application is a continuation application of, and claims priority to, U.S. patent application Ser. No. 13/858,325, titled "SELECTING A TEMPLATE FOR A CONTENT ITEM," filed on Apr. 8, 2013. The disclosure of the foregoing application is incorporated herein by reference in its entirety for all purposes.

BACKGROUND

This specification relates to data processing and content distribution.

The Internet enables access to a wide variety of resources. For example, video, audio, webpages directed to particular subject matter, news articles, images, and other resources are accessible over the Internet. The wide variety of resources that are accessible over the Internet has enabled opportunities for content distributors to provide content items with resources that are requested by users. Content items are units of content (e.g., individual files or a set of files) that are presented in/with resources (e.g., web pages). An advertisement is an example of a content item that advertisers can provide for presentation with particular resources, such as web pages and search results pages. An advertisement can be made eligible for presentation with specific resources and/or resources that are determined to match specified distribution criteria, such as distribution keywords.

SUMMARY

In general, innovative aspects of the subject matter described in this specification can be embodied in methods that include the actions of receiving a content item request that includes context data, the context data including at least one of user context data and resource context data, the user context data indicating a user group associated with a user to whom the requested content item will be presented, the resource context indicating a resource on which the content item will be presented; in response to receiving the content item request: identifying a content item that is eligible to be presented in response to the content item request; determining that the content item includes a template variable that is resolved based on the context data; identifying, based on the template variable, a template feed from which a template for the content item is to be selected, the template feed including a set of templates; selecting, from the template feed, a template for the content item, the template being selected based on the context data; and populating the selected template with content for the content item to create a formatted content item; and providing the formatted content item in response to the content item request. Other embodiments of this aspect include corresponding systems, apparatus, and computer programs, configured to perform the actions of the methods, encoded on computer storage devices.

These and other embodiments can each optionally include one or more of the following features. Selecting a template for the content item can include identifying a contextual performance measure for each template with respect to the context data and selecting the template based on the identified contextual performance measures for the templates.

Identifying a contextual performance measure for a particular template with respect to the context data can include identifying a performance of the content item for presentations of the content item when the particular template has been used to create the content item for presentation in response to other content item requests that included one or more user attributes of the user context data. Identifying a contextual performance measure for a particular template with respect to the context data can include identifying a performance of content items that were created with the particular template and presented with the resource.

Identifying a contextual performance measure for a particular template with respect to the context data can include identifying a first performance measure that is based on a performance of the content item when the particular template has been used to create the content item for presentation in response to other content item requests that included a particular user attribute of the user context data; identifying a second performance measure that is based on a performance of other content items when the particular template has been used to create the other content items for presentation with the resource; and determining the contextual performance measure using the first performance measure and the second performance measure.

The selected template can include one or more content variables that are resolved based on the context data. A content element can be selected for each content variable based on a performance of each content element with respect to the context data.

Aspects can further include receiving filtering data for the advertiser, the filtering data specifying a proper subset of templates that are eligible to be used for content item requests including a particular set of context data; and filtering the set of templates based on the filtering data and the context data.

Particular embodiments of the subject matter described in this specification can be implemented so as to realize one or more of the following advantages. Advertisements, or other content items, can be provided using a template or layout that is selected based on context data that includes data about a recipient of the advertisement and/or data about a resource on which the advertisement is going to be presented. The template can be selected from available templates based on the performance of the templates with respect to the context data, thereby improving the performance of the advertisement. The templates can be provided by the content item provider, for example, in a template feed, and the templates can be selected on a per-impression basis.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
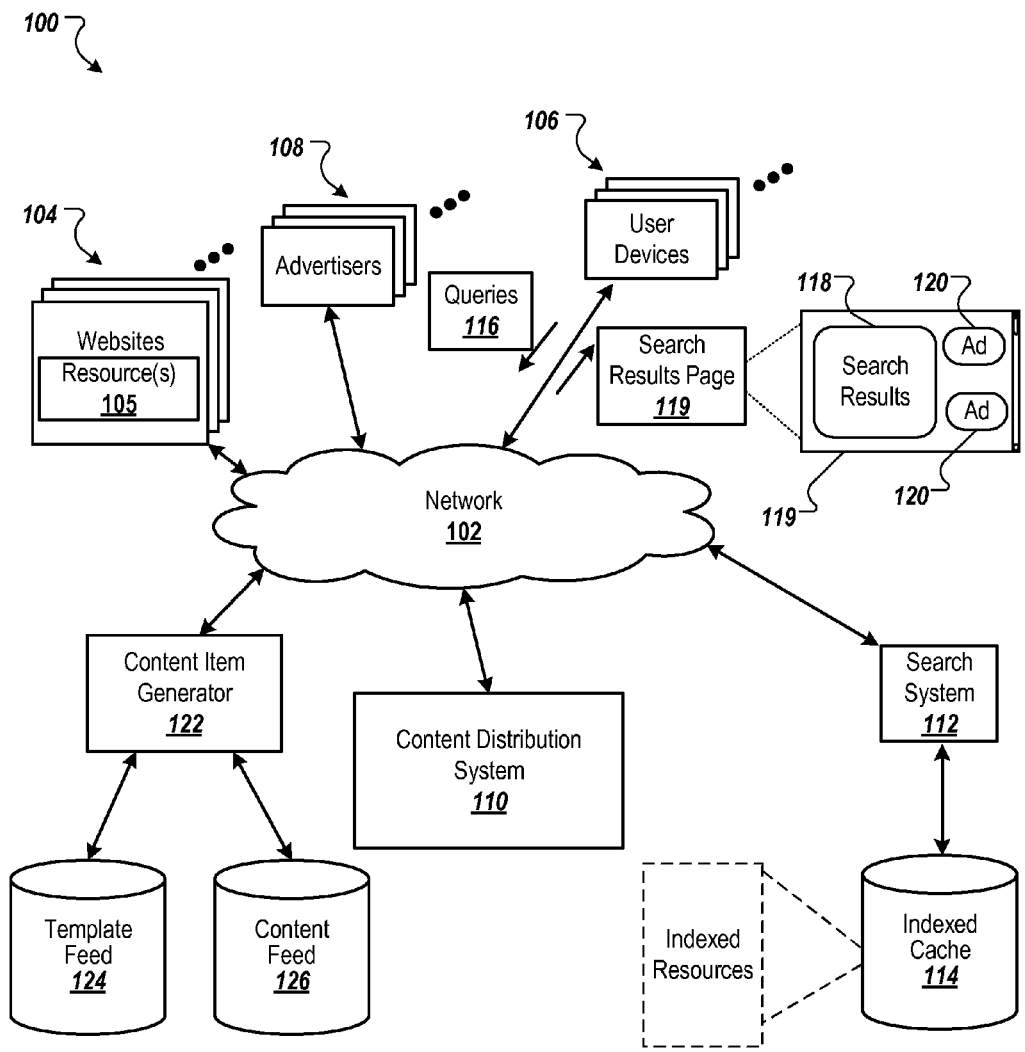
FIG. 1 is a block diagram of an example environment in which content distribution system distributes content to user devices.

Content items (e.g., online advertisements, audio files, video files, or other online content) are selected for presentation in response to a content item request based, in part, on information included in the content item request. For example, a particular content item request may indicate that the requested content item will be presented in a search results page that is provided in response to the search query "festival". In this example, the content item that is provided in response to the request can be selected based, at least in part, on the search query matching a distribution keyword for the content item.

A template or layout for a content item is selected based on the information included in a content item request. For example, a template for an advertisement may include placeholders for a title and a carousel of images of products being advertised, while another template may include placeholders for a single image and textual content, such as a product description and pricing information. The template can be chosen on a per-request basis to improve performance (e.g., click-through rate) for the provided content item.

The templates available for selection can be provided by way of a template feed. The template feed is a set of templates that can be provided, for example, by the advertiser. The template feed can be updated at any time by the advertiser, and at the time that an impression is received, the templates in the feed at that time will be available for selection based on the information in the content item request. To facilitate selection of a template without creating multiple advertisements, a single advertisement can include a template variable that is resolved at the time the request is received, such that the same advertisement can be presented in many different formats depending on the context of the request.

The template can be selected based on context data included in the content item request. This context data can include data about a user to whom the content item will be presented and/or information about a resource on which the content item will be presented. For example, the template used to present content to a user device in Atlanta may differ from the template used to present the same content to a user device in New York. Similarly, the template used to present content on a search results page may differ from the template used to present the same content on an online shopping web page.

A particular template may be selected based, at least in part, on historical performance of the template when the template is used to present content. For example, some groups of users may respond better to (e.g., interact with more) advertisements that are presented using certain types of templates, while other groups of users may respond better to other types of templates. Similarly, some types of templates may receive a better response when presented on resources having certain attributes (e.g., content, topic, color scheme, etc.) than on other resources having different attributes. Thus, the particular template that is selected for presenting content can be based on an analysis of the performance of the templates when used to provide content to users having the combination of user attributes specified in the content item request and/or an analysis of the performance of the templates when used to provide content on resources having the combination of resource attributes specified in the content item request.

The description that follows generally describes generating advertisements that are selected in response to an advertisement request. The description is also applicable to generating or modifying other types of content items (e.g., video files, audio files, application scripts, or other content) that is requested through other content item requests.

For situations in which the systems described here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, users may have control over how information is collected about them and used by a content server.

FIG. 1 is a block diagram of an example environment 100 in which content distribution system 110 distributes content to user devices 106. The example environment 100 includes a network 102 such as a local area network (LAN), wide area network (WAN), the Internet, or a combination thereof. The network 102 connects websites 104, user devices 106, advertisers 108, and the content distribution system 110. The example environment 100 may include millions of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website 104.

A resource 105 is data provided by the website 104 over the network 102 and that is associated with a resource address. Resources include HTML pages, word processing documents, and portable document format (PDF) documents, images, video, and feed sources, to name only a few. The resources can include content, e.g., words, phrases, images and sounds that may include embedded information (such as meta-information in hyperlinks) and/or embedded instructions (such as scripts).

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources, the environment can include a search system 112 that identifies the resources by crawling and indexing the resources provided by the publishers on the websites 104. Data about the resources can be indexed based on the resource to which the data corresponds. The indexed and, optionally, cached copies of the resources are stored in an indexed cache 114.

User devices 106 can submit search queries 116 to the search system 112 over the network 102. In response, the search system 112 accesses the indexed cache 114 to identify resources that are relevant to the search query 116 (e.g., have at least a threshold relevance score with respect to the search query). The search system 112 identifies the resources in the form of search results 118 and returns the search results 118 to the user devices 106 in search results pages 119.

A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages 119 can also include one or more advertisement slots 120 in which advertisements can be presented. The advertisement slots 120 can also facilitate presentation of other content items instead of, or in addition to, advertisements.

When search results 118 are requested by a user device 106, the content distribution system 110 receives an advertisement request (or another content item request) requesting advertisements (or another content item) to be provided with the search results 118. The content distribution system 110 can also receive an advertisement request (or other content item request) requesting advertisements (or other content items) to be provided with a resource 105, such as a news website, a game, a shopping site, or other type of resource 105. For example, a resource 105 may include one or more advertising slots, each for displaying an advertisement.

The advertisement request can include context data, which can be used to select advertisements for presentation in the advertisement slots. This context data can include resource context data and/or user context data. The user context data can include general data about a user to which the advertisement will be presented and/or data about the user device on which the advertisement will be presented. For example, assuming that a user has previously consented to use of such data for selecting content, the advertisement request can include user profile data (e.g., demographic data, product category interests, advertisement preferences, or other user profile data), and/or other information, such as identified user interests, with which an advertisement can be selected for presentation. The data about the user device may include, for example, data specifying the type of user device (e.g., mobile or non-mobile), the operating system or web browser of the user device, and/or geographic information specifying a geographic location associated with the user device 106.

In general, the resource context data includes characteristics about the resource on which the advertisement slots are included, the publisher of the resource, and/or the advertisement slots 120. For example, the resource context data for a search results page may include data specifying one or more terms of the search query 116 in response to which the search results page 119 is being provided, a size of the advertisement slot 120, and/or media types that are eligible for presentation in the advertisement slot 120. The one or more terms of the search query 116 can facilitate identification of advertisements that are relevant to the search query 116. The resource context data can also include data specifying a category or topic for the resource or publisher (e.g., sports, travel, news, etc.), the color scheme or other visual characteristics of the resource, a number of advertisement slots included on the resource, types of content presented on the resource (e.g., images, videos, or advertisements), number of frames, or other characteristics of the resource or publisher.

Based on data included in the advertisement request, the content distribution system 110 selects advertisements that are eligible to be provided in response to the advertisement request ("eligible advertisements"). Eligible advertisements can include, for example, advertisements having characteristics that match the characteristics of the advertisement slots 120.

In some implementations, advertisements that are selected as eligible advertisements by the content distribution system 110 are those advertisements having distribution parameters (i.e., data with which distribution of the advertisement is managed) that match the context data (or a portion thereof) included with the advertisement request. For example, the eligible advertisements may be those that have a distribution parameter that matches a search query 116 and/or the user and/or resource context data included in the advertisement request. The content distribution system 110 can select, from the set of eligible advertisements, one or more advertisements for presentation with the search results page 119 or resource 105. Each advertisement can be selected for presentation based, at least in part, on how well a distribution keyword (also referred to as a keyword) for the advertisement matches the context data and/or on the outcome of an auction.

A distribution keyword can match a search query by having the same textual content ("text") as the search query. For example, an advertisement (or another content item) associated with the distribution keyword "basketball" can be selected for presentation with a search results page that is provided in response to the search query "basketball," since the search query and the distribution keyword are exactly the same. This is referred to as an exact match.

A distribution keyword can also match a search query by having text that is identified as being sufficiently relevant, or sufficiently similar, to the search query despite having different text than the search query. For example, an advertisement (or another content item) associated with the distribution keyword "basketball" may also be selected for presentation with a search results page that is provided in response to the search query "sports" because basketball is a type of sport, and, therefore, is relevant to the term "sports."

For purposes of this document, a distribution keyword can be considered to match a search query when a measure of similarity (e.g., semantic or topical similarity) between the distribution keyword and the search query meets a specified threshold value. The measure of similarity can be specified based on an edit distance between the search query and the distribution keyword, user feedback specifying a measure of similarity between the search query and the distribution keyword, a distance between a topic classification for the search query and a topic classification for the search query, or another indication of similarity between the search query and the distribution keyword (e.g., each of the search query and the distribution keyword being categorized to a same topic in a topical hierarchy).

In general, many advertisers (and other content item providers) would like to provide each user with a formatted advertisement that is most likely to result in the user taking some action, such as purchasing a product being advertised. For example, some users may prefer to view images of products in an advertisement, while other users may prefer to view pricing information or promotional offers. As some groups of users are more likely to select an advertisement that is displayed in a particular format than an advertisement that is displayed in a different format, it can be beneficial to the advertiser and to the users to present the advertisements using the preferred format. However, this would require the advertiser to determine the preferred format for the user groups and to create a different advertisement for each user group.

Similarly, certain advertisement formats may perform better when presented on resources having a particular set of attributes. For example, advertisements that display product images may perform better when displayed on particular categories of resources than advertisements that do not include product images.

The environment 100 includes a content item generator 122, which is a data processing apparatus that generates a formatted content item to provide in response to a content item request. In some implementations, the content item is an advertisement that is generated for presentation with a search results page 119 or another resource 105, and for purposes of example, the description that follows discusses the creation of an advertisement. In FIG. 1, the content item generator 122 is in communication with the content distribution system 110 through the network 102. In some implementations, the content item generator 122 is implemented to be in communication with the content distribution system 110 or can be implemented as part of the content distribution system 110.

When the content distribution system 110 receives an advertisement request (or another content item request) from a user device 106 (or the search system 112), the content distribution system 110 submits a request to the content item generator 122 for a formatted advertisement to be provided in response to the request. The request for the advertisement includes context data specifying resource context data and/or user context data. The resource context data specifies attributes associated with the resource 105 or search results page 119 for which the advertisement is to be generated. For example, if the advertisement is going to be presented on a search results page 119, the resource context data may include a search query for which the search results page 119 is being provided. If the advertisement is going to be presented on a resource 105, the resource context data may include data specifying a category or topic for the resource 105.

The user context data specifies attributes associated with the user and/or the user device 106 to which the advertisement will be provided. For example, the user context data may include user profile data (assuming the user has previously consented to use of profile data), and/or data specifying whether the user device 106 is a mobile device. The user context data may also include cookie data specifying one or more resources that have been requested by the user device 106 and/or one or more search queries that have been submitted by the user device 106.

Using the context data included in the request, the content item generator 122 can select a template for the advertisement from a template feed 124. The template feed 124 includes a set of advertisement templates that can be populated with content to generate a formatted advertisement. For example, a template in the template feed 124 may include placeholders for a title, a logo, descriptive text, and/or one or more images. Another template in the template feed 124 may include placeholders for different content, or a different arrangement of the content.

Each advertiser 108 that creates a customizable advertisement can also create or identify one or more feeds of templates that can be used to create formatted advertisements. For example, an advertiser 108 may create a template feed 124 for each individual advertisement, for one or more groups of advertisements, or for each of the advertiser's advertisements. The advertiser 108 can create a template feed 124 by creating and providing advertisement templates to the content item generator 122 by way of the network 102. For example, the content item generator 122 can include a user interface that enables advertisers 108 to create, upload, or modify advertisement templates in the advertiser's template feed 124. In another example, the content item generator 122 may include a user interface that enables the advertisers 108 to select templates for their template feeds 126 from a set of advertisement feeds created or maintained by the content item generator 122. For example, the content item generator 122 may include a set of standard advertisement templates from which advertisers 108 can select templates for their advertisement feed(s).

The advertiser 108 may also specify filtering rules for filtering the templates of a template feed 124 based on context data of an advertisement request. For example, the advertiser 108 may specify a filtering rule that limits the template feed 124 to a proper subset of templates for use in creating advertisements that will be displayed in a particular geographic location, such as Atlanta. If the context data for an advertisement request specifies that the advertisement will be presented on a device located in Atlanta, the content item generator 122 can select a template from the proper subset rather than the entire template feed 124.

The content item generator 122 can also populate a selected template with content to generate a formatted advertisement. For example, if the template includes placeholders for a product offer and a product image, the content item generator 122 can identify a product offer and a product image and populate the template with the product offer and the product image to create the formatted advertisement.

The content for an advertisement can be selected from a content feed 126, for example based on the selected template and/or the context data of the advertisement request. The content feed 126 is a set of content elements that are available to be inserted into an advertisement template to create a formatted advertisement. Each advertiser 108 that creates a customizable advertisement can also create or identify one or more sets of feed data with which advertisement templates will be populated. A content feed 124 may include text, images, logos, videos, graphics, product offers, information, links to additional information, and/or other content that can be used to create an advertisement.

Figure 2:
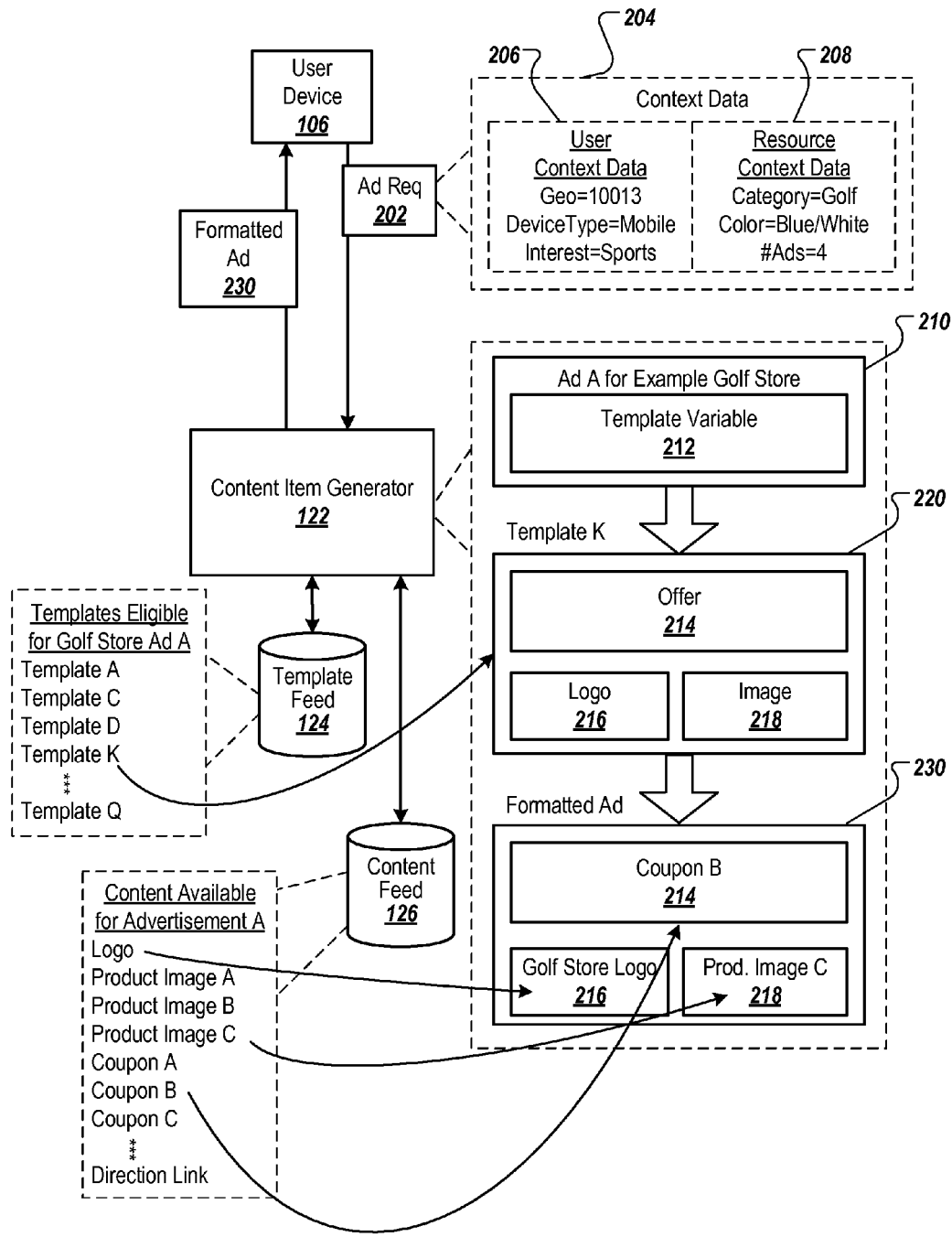
FIG. 2 is a block diagram of an example data flow for generating a formatted advertisement.

FIG. 2 is a block diagram of an example data flow 200 for generating a formatted advertisement. The data flow 200 begins with the content item generator 122 receiving an advertisement request 202. The advertisement request 202 can be received from user device 106, a search system 112, a resource 105, or a content distribution system, 110 to name a few examples. The advertisement request 202 includes context data 204 that may include user context data 206 and/or resource context data 208. For example, the user context data 206 may specify that the user device from which the advertisement request is received is a mobile device, that a zip code of 30309 is associated with the user device, and that a user associated with the user device has an interest in sports. The resource context data 208 may specify that the resource belongs to a content category of golf, has a color scheme of blue and white, and includes four advertisement slots. Other user and resource context data that are available can be used in a manner similar to that described below to select a template and/or content for a customizable advertisement.

The content item generator 122 (or the content distribution system 110) selects an advertisement to provide in response to the advertisement request. For example, the content item generator 122 may select a customizable advertisement based on the context data of the advertisement request. In this example, the content item generator selected customizable advertisement 210, "Ad A for Example Golf Store", based on the context data 204. The customizable advertisement may include a template variable 212 (or another placeholder) that is resolved using the template feed 124 and based on the context data 204. The template variable specifies that an advertisement template is to be selected for the customizable advertisement.

The content item generator 122 selects, based on the context data 204 (e.g., user context data 206 and/or the resource context data 208), an advertisement template from the template feed 124. In some implementations, the content item generator 122 selects the advertisement template based on contextual performance measures for the advertisement templates with respect to the context data 204. The contextual performance measures may be click through rates, conversion rates, or other performance metrics. Example contextual measures that may be used in selecting an advertisement template are described below with reference to FIG. 3.

In this example, the template feed 124 includes several advertisement templates, "Template A" through "Template Q", that are available for the selected advertisement 210. Based on the context data 204, the content item generator 122 selected advertisement template 220, "Template K", from the template feed 124. The advertisement template 220 can include one or more variables (or other placeholders) that are populated with content to create a formatted advertisement. In particular, the advertisement template 220 includes a variable for a product offer 214, a variable for a logo 216, and a variable for an image 218.

The content item generator 122 can select content for each of the variables 214-218, for example based on the context data 204, and populate the advertisement template 220 with the selected content. The content can be selected from the content feed 126. The content feed 126 can include content elements that are available for insertion in advertisements created for "Ad A". For example, the content feed 126 includes a logo, several product images, several coupons, and a direction link. In this example, the content item generator 122 selected "Coupon B' as the content element to resolve the product offer variable 214. Thus, the content item generator 122 will insert this content element into the advertisement template 220 in the place of the variable 214. Similarly, the content item generator 122 will insert the content element "Golf Store Logo" in the place of variable 216 and "Product Image C" in place of variable 218 to create a formatted advertisement 230.

Once the formatted advertisement 230 has been created by populating the selected advertisement template 220 with the selected content, the formatted advertisement 230 (or data specifying a location of the formatted advertisement 230) is provided to the user device 106.

Figure 3:
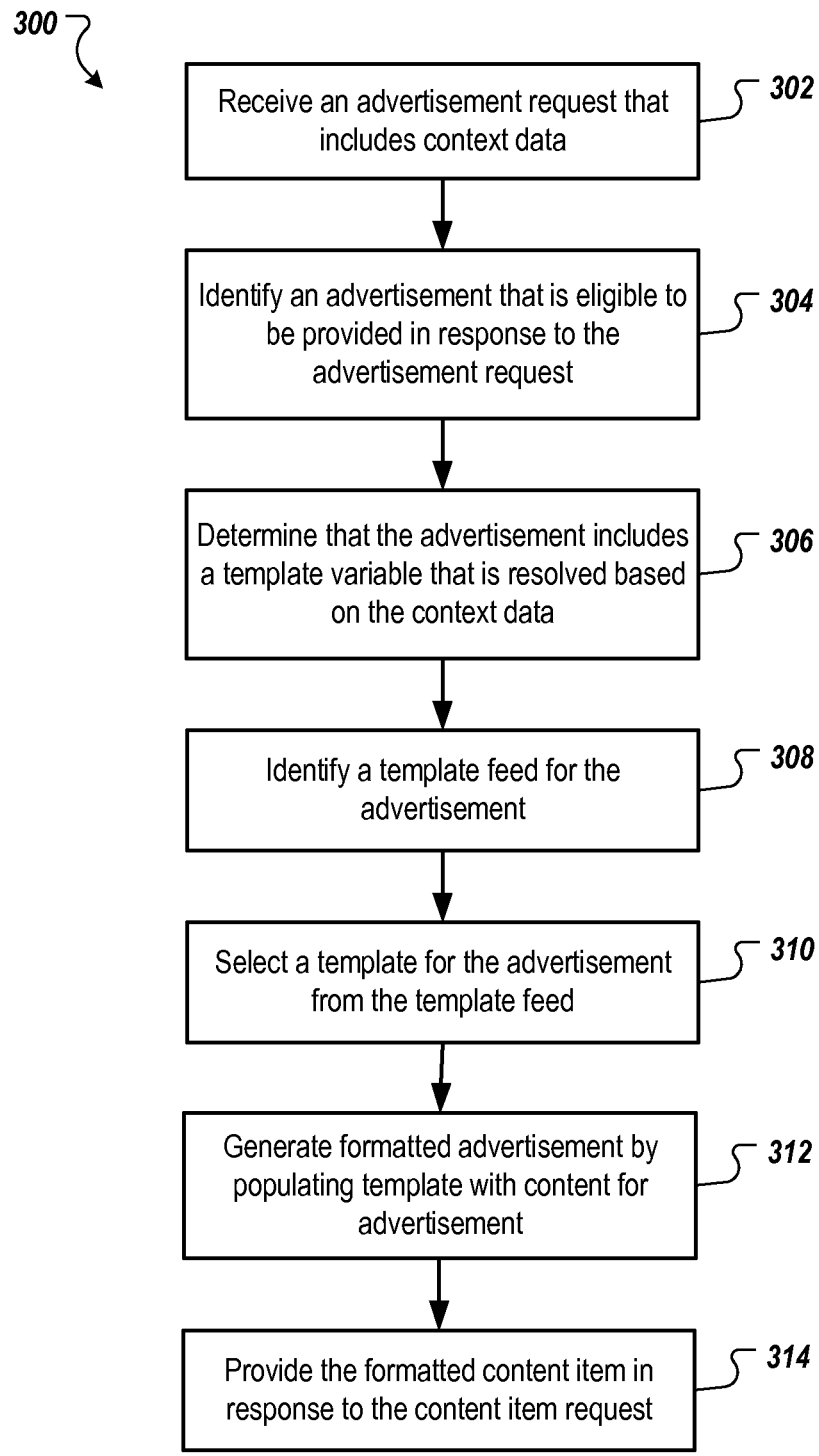
FIG. 3 is a flow chart of an example process for providing an advertisement.

FIG. 3 is a flow chart of an example process 300 for providing a formatted advertisement. The operations of example process 300 can also be used to provide other formatted content items. Operations of the process 300 can be implemented, for example, by a data processing apparatus, such as the content item generator 122 and/or the content distribution system 110 of FIG. 1. The process 300 can also be implemented as instructions stored on computer storage medium, and execution of the instructions by a data processing apparatus cause the data processing apparatus to perform the operations of this process 300.

An advertisement request including context data is received (302). The advertisement request can be received from a user device or from a content distribution system that provides advertisements to user devices that have requested an advertisement. The user context data are data that characterize a presentation opportunity for an advertisement that is presented in response to the advertisement request.

The context data can include user context data and/or resource context data. As described above, the user context data can include general data about a user to which the advertisement will be presented and/or data about the user device on which the advertisement will be presented. The resource context data can include data about a resource or search results page on which the advertisement will be presented.

An advertisement that is eligible to be provided in response to the advertisement request is identified (304). In some implementations, the advertisement is selected based on a determination that a search query identified by the context data matches a distribution keyword for the advertisement. For example, assume that a particular advertisement for a truck manufacturer uses the distribution keyword "truck" to control distribution of the advertisement. In this example, the advertisement will be eligible to be distributed when the context data includes data indicating that the user device submitted the search query "truck."

Additionally, or alternatively, the advertisement may be selected based on a determination that one or more user attributes or resource attributes included in the context data match the distribution parameters for the advertisement. For example, assume that an advertiser has requested that a particular set of advertisements be distributed when, in addition to the distribution keyword matching the search query, the user device is located within a specified distance of a business location for the advertiser. In this example, the particular set of advertisements will not be eligible for distribution if either the user device is not within the specified distance of the business location for the advertiser or the search query that was submitted by the user does not match a distribution keyword for the particular set of advertisements.

A determination is made that the identified advertisement includes a template variable that is resolved based on the context data (306). For example, the advertisement may be a customizable advertisement that includes a template variable that is resolved based on the context data (e.g., the user context data and/or the resource context data). The template variable can specify that a template is to be selected for the advertisement from a template feed based on an evaluation of the context data.

A template feed is identified for the advertisement (308). The template feed can include a set of templates that are eligible for use in creating a formatted advertisement. For example, the advertiser associated with the identified advertisement may create a template feed for the advertisement or for a group of advertisements. The advertiser may also generate and/or select advertisement templates to include in the template feed. In response to determining that the advertisement includes a template variable, the content item generator 122 can identify the template feed that includes the templates for the advertisement.

An advertisement template is selected from the advertisement feed (310). In some implementations, advertisement template is selected from templates in the template feed based on contextual performance measures for the templates with respect to the context data. In general, the contextual performance measure for an advertisement template indicates how well the template performs with respect to the user context data and/or the resource context data.

In some implementations, the contextual performance measure for an advertisement template with respect to the context data may be based on the performance of one or more advertisements when the advertisements are provided using the template in response to advertisement requests having context data that matches, or is similar to, the context data of the advertisement request. For example, the contextual performance measure for an advertisement template may be based on the performance of the advertisement that is to be provided in response to the advertisement request when the advertisement is provided in the advertisement template in response to advertisement requests that included context data that matches the context data of the received advertisement request.

To illustrate, consider an advertisement for a particular bike. This advertisement may be provided using multiple templates for advertisement requests that have included context data that matches the context data of the received advertisement request. The content distribution system 110 may store the performance of the advertisement for the bike with respect to each template and with respect to particular combinations of context data. For example, the advertisement may have a click-through rate of 0.01 for a first template and 0.02 for a second template when the advertisement is provided in response to advertisement requests having a particular combination of context data. In this example, the second template may be selected for generating the advertisement for advertisement requests having the particular combination of context data as it has a better performance than the first template.

In some implementations, the contextual performance measure for an advertisement template may be based on the performance of multiple advertisements that have been provided using the advertisement template in response to advertisement requests that included context data that matches the context data of the received advertisement request. For example, the contextual performance measure for the advertisement template may be based on the performance of each of the advertiser's advertisements, advertisements in a particular advertisement campaign, or advertisements for multiple advertisers. For example, the advertisement template may be available to all or a subset of all of the advertisers that have created customized advertisements for distribution by the content distribution system and/or the content item generator 122. The performance of the advertisement template can be recorded across each of the advertiser's advertisements that have been provided using the advertisement template and with respect to particular combinations of context data. These performance measures can be aggregated (e.g., averaged) to determine the contextual performance measure for the advertisement template for each particular combination of context data.

In some implementations, the contextual performance measure for an advertisement template may be based on multiple performance measures for the template. For example, the performance of the template may be stored for individual contextual data elements (e.g., type or user device or topic of resource) or combinations of context data. The multiple performance measures can be aggregated, for example, by averaging or other measure of central tendency, to determine the contextual performance measure for the advertisement template.

In some implementations, the contextual performance measure for an advertisement template with respect to the context data may be based on a first contextual performance measure that is based on the performance of the template with respect to the user context data and a second performance measure that is based on the performance of the template with respect to the resource context data. For example, the first contextual performance measure may be based on the performance of the advertisement when the advertisement template has been used to generate the advertisement in response to advertisement requests that included user context data that matches the user context data of the received advertisement request. In general, this first contextual performance measure indicates how well the template has performed for users (and/or user device) that are similar to the user (and/or user device) from which the advertisement request was received.

Similarly, the second contextual performance measure may be based on the performance of the advertisement when the advertisement template has been used to generate the advertisement in response to advertisement requests that included resource context data that matches the resource context data of the received advertisement request. In general, this second contextual performance measure indicates how well the template has performed for resources (or search result pages) that are similar to the resource (or search result page) from which the advertisement request was received. The first and second performance measures can be based on the performance of the template with respect to the advertisement that has been identified to be provided in response to the advertisement request or for multiple advertisements.

The content item generator 122 can use the contextual performance measures for the advertisement templates to select an advertisement template for the advertisement. For example, the content item generator 122 may select the template that has the highest contextual performance measure.

In some implementations, the advertiser may define one or more filtering rules for filtering the templates of the template feed based on the context data. For example, the advertiser may define a filtering rule for advertisement requests that include context data specifying a baseball-related resource. This filtering rule may limit the templates available for baseball-related resources to a proper subset of the templates included in the template feed. For example, the template feed may include ten templates that are eligible for the advertisement. However, the filtering rule may specify that six of the templates are available for generating the advertisement for presentation on a baseball-related resource. In this example, the template may be selected from the six templates based on the contextual performance measures for the six templates.

A formatted advertisement is generated by populating the selected template with content for the advertisement (312). As described above, content elements for an advertisement may be stored in a content feed for the advertisement. The content item generator 122 (or other data processing apparatus) can select content from the content feed based on the selected template and/or the context data. For example, the selected template may include placeholders for particular types of content, such as images, promotional offers, links to additional data, logos, text, or other content. If there are multiple content elements available for a particular placeholder, then the content may be selected based on the context data. For example, the content elements may be selected based on contextual performance measures for the content elements with respect to the context data, similar to the way that the template is selected.

The content item generator 122 can populate the selected template with the selected content to generate the formatted advertisement. For example, the content item generator 122 can insert the content elements into the place of their respective placeholders to generate the formatted advertisement.

The formatted advertisement is provided in response to the content item request (314). The formatted advertisement can be provided to the user device that requested the advertisement or to a content distribution system that manages the distribution of content to user devices.

Figure 4:
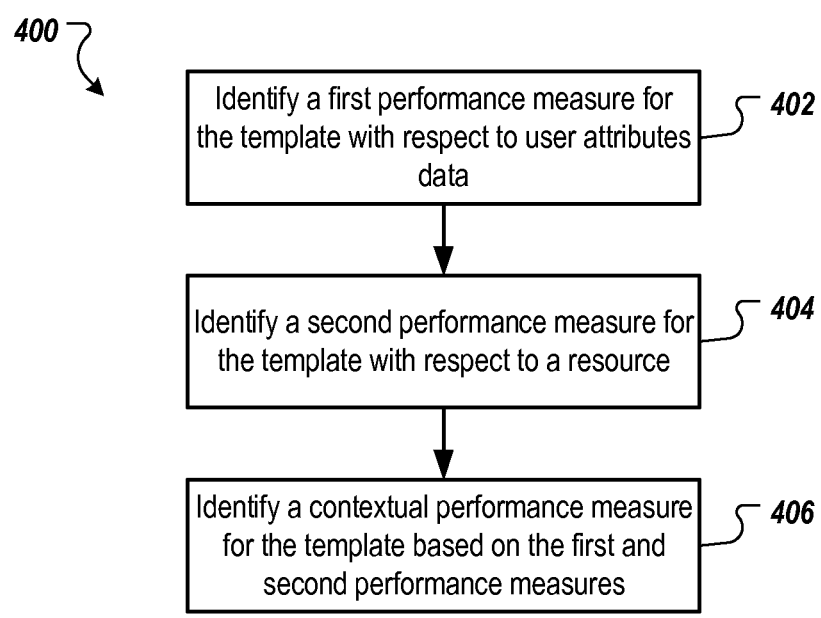
FIG. 4 is a flow chart of an example process for identifying a contextual performance measure for an advertisement template.

FIG. 4 is a flow chart of an example process 400 for identifying a contextual performance measure for an advertisement template. Operations of the process 400 can be implemented, for example, by a data processing apparatus, such as the content item generator 122 and/or the content distribution system 110 of FIG. 1. The process 400 can also be implemented as instructions stored on computer storage medium, and execution of the instructions by a data processing apparatus cause the data processing apparatus to perform the operations of this process 400.

A first performance measure for the advertisement template is identified (402). In general, the first performance measure for the advertisement template may be based on the performance of the template with respect to a particular combination of user context data. For example, the first performance measure for the advertisement template may be based on the performance of one or more advertisements when the advertisement(s) are provided in response to advertisement requests that include user context data that matches or is similar to the particular combination of user context data. For example, the particular combination of user context data may specify a zip code of 30309 and a user device type of mobile device. In this example, the first performance measure may be based on the performance of advertisement(s) that have been generated using the advertisement template and provided in response to advertisement requests that were received from mobile devices associated with a zip code of 30309, a nearby zip code, or a geographic region that includes the zip code of 30309.

The first performance measure may be based on the performance of a particular advertisement that is to be provided in response to a particular advertisement request that includes the user context data irrespective of the performance of other advertisements. In addition, or in the alternative, the first performance measure may be based on the performance of other advertisements with respect to the user context data. For example, the performance of other advertisements can be aggregated (e.g., summed, averaged, or otherwise aggregated) to determine the first performance measure.

A second performance measure for the advertisement template is identified (404). In general, the second performance measure for the advertisement template may be based on the performance of the template with respect to a particular combination of resource context data. For example, the second performance measure for the advertisement template may be based on the performance of one or more advertisements when the advertisement(s) are provided in response to advertisement requests that include resource context data that matches or is similar to the particular combination of user context data. For example, the particular combination of resource context data may specify a resource topic of "football" and a color scheme of blue and white. In this example, the first performance measure may be based on the performance of advertisement(s) that have been generated using the advertisement template and provided in response to advertisement requests that were received from resources related to football and that have a color scheme of blue and white.

The second performance measure may also be based on the performance of a particular advertisement that is to be provided in response to particular advertisement requests that include the resource context data irrespective of the performance of other advertisements. In addition, or in the alternative, the second performance measure may be based on the performance of other advertisements with respect to the resource context data.

A contextual performance measure for the advertisement is determined based on the first performance measure and/or the second performance measure (406). For example, the first and second performance measures may be averaged, summed, or otherwise combined to determine the contextual performance measure for the advertisement template.

Figure 5:
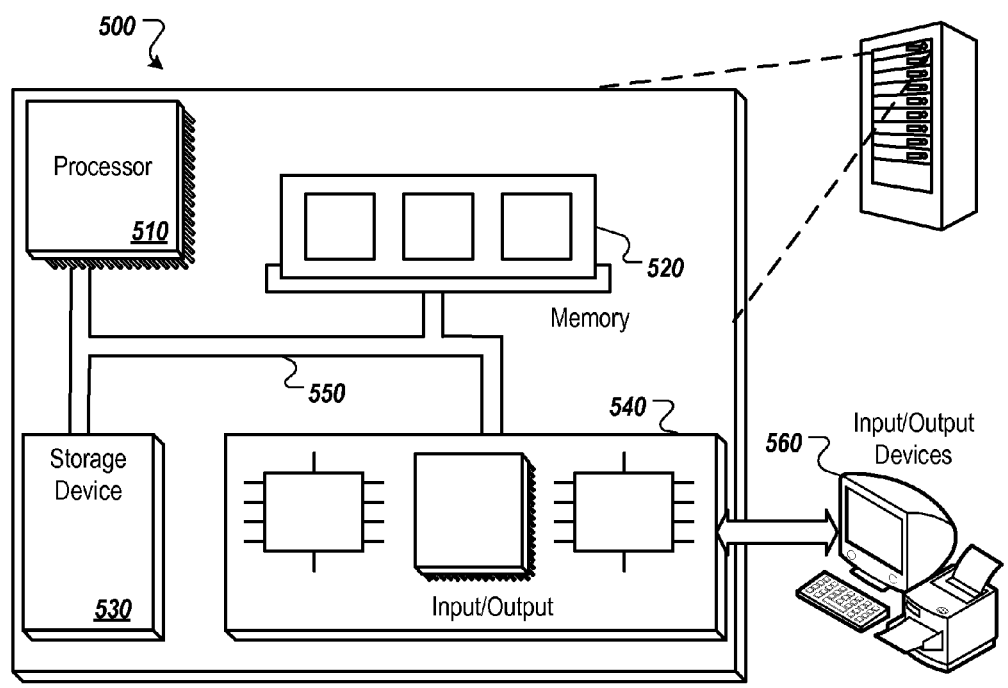
FIG. 5 is block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a content item request that includes context data specifying a user group that will be presented a content item and a resource on which the content item will be presented;
   in response to receiving the content item request:
   identifying a given content item that is eligible to be presented in response to the content item request;
   identifying a template feed from which a template for the given content item is to be selected, the template feed including a set of templates;
   determining, for each particular template from the set of templates, a contextual performance measure based on (i) a performance of one or more first content items when the particular template has been used to create the one or more first content items for presentation in response to content item requests that included a particular attribute of the context data and (ii) a performance of one or more second content items when the particular template has been used to create the one or more second content items for presentation with the resource;
   selecting, from the template feed and based on the contextual performance measure of each template in the set of templates, a template for the given content item;
   populating the selected template with content for the given content item to create a formatted content item; and
   providing the formatted content item in response to the content item request.

2. The method of claim 1, wherein the one or more first content items include the given content item.

3. The method of claim 1, wherein the one or more second content items include the given content item.

4. The method of claim 1, wherein the particular attribute comprises a user attribute that describes members of the user group.

5. The method of claim 1, wherein the contextual performance measure for each particular template is based on a performance of one or more third content items when the particular template has been used to create the one or more third content items for presentation with resources that have one or more attributes that match one or more attributes of the resource.

6. The method of claim 1, wherein:
   the one or more first content items include one or more content items that are different from the given content item; and
   the one or more second content items include one or more content items that are different from the given content item.

7. The method of claim 1, further comprising:
   receiving filtering data specifying a proper subset of templates in the set of templates that are eligible to be used for content item requests including a particular set of context data; and
   filtering the set of templates based on the filtering data and the context data of the received content item request.

8. A system, comprising:
   a data processing apparatus; and
   a memory storage apparatus in data communication with the data processing apparatus, the memory storage apparatus storing instructions executable by the data processing apparatus and that upon such execution cause the data processing apparatus to perform operations comprising:
   receiving a content item request that includes context data specifying a user group that will be presented a content item and a resource on which the content item will be presented;
   in response to receiving the content item request:

identifying a given content item that is eligible to be presented in response to the content item request;

identifying a template feed from which a template for the given content item is to be selected, the template feed including a set of templates;

determining, for each particular template from the set of templates, a contextual performance measure based on (i) a performance of one or more first content items when the particular template has been used to create the one or more first content items for presentation in response to content item requests that included a particular attribute of the context data and (ii) a performance of one or more second content items when the particular template has been used to create the one or more second content items for presentation with the resource;

selecting, from the template feed and based on the contextual performance measure of each template in the set of templates, a template for the given content item;

populating the selected template with content for the given content item to create a formatted content item; and providing the formatted content item in response to the content item request.

9. The system of claim 8, wherein the one or more first content items include the given content item.

10. The system of claim 8, wherein the one or more second content items include the given content item.

11. The system of claim 8, wherein the particular attribute comprises a user attribute that describes members of the user group.

12. The system of claim 8, wherein the contextual performance measure for each particular template is based on a performance of one or more third content items when the particular template has been used to create the one or more third content items for presentation with resources that have one or more attributes that match one or more attributes of the resource.

13. The system of claim 8, wherein:
the one or more first content items include one or more content items that are different from the given content item; and
the one or more second content items include one or more content items that are different from the given content item.

14. The system of claim 8, wherein the operations further comprise:
receiving filtering data specifying a proper subset of templates in the set of templates that are eligible to be used for content item requests including a particular set of context data; and
filtering the set of templates based on the filtering data and the context data of the received content item request.

15. A non-transitory computer storage medium encoded with a computer program, the program comprising instructions that when executed by a data processing apparatus cause the data processing apparatus to perform operations comprising:

receiving a content item request that includes context data specifying a user group that will be presented a content item and a resource on which the content item will be presented;

in response to receiving the content item request:
identifying a given content item that is eligible to be presented in response to the content item request;
identifying a template feed from which a template for the given content item is to be selected, the template feed including a set of templates;
determining, for each particular template from the set of templates, a contextual performance measure based on (i) a performance of one or more first content items when the particular template has been used to create the one or more first content items for presentation in response to content item requests that included a particular attribute of the context data and (ii) a performance of one or more second content items when the particular template has been used to create the one or more second content items for presentation with the resource;
selecting, from the template feed and based on the contextual performance measure of each template in the set of templates, a template for the given content item;
populating the selected template with content for the given content item to create a formatted content item; and
providing the formatted content item in response to the content item request.

16. The non-transitory computer storage medium of claim 15, wherein the one or more first content items include the given content item.

17. The non-transitory computer storage medium of claim 15, wherein the one or more second content items include the given content item.

18. The non-transitory computer storage medium of claim 15, wherein the particular attribute comprises a user attribute that describes members of the user group.

19. The non-transitory computer storage medium of claim 15, wherein the contextual performance measure for each particular template is based on a performance of one or more third content items when the particular template has been used to create the one or more third content items for presentation with resources that have one or more attributes that match one or more attributes of the resource.

20. The non-transitory computer storage medium of claim 15, wherein:
the one or more first content items include one or more content items that are different from the given content item; and
the one or more second content items include one or more content items that are different from the given content item.

* * * * *